United States Patent

Dasher et al.

Patent Number: 5,232,637
Date of Patent: Aug. 3, 1993

[54] OPHTHALMIC LENS METHOD

[75] Inventors: David Dasher; E. Robert Fretz, Jr.; Mark S. Friske, all of Corning; Reba S. Herndon, Horseheads, all of N.Y.; Ronald E. Johnson, Tioga, Pa.; David J. Kerko, Corning, N.Y.; John W. Nelson, Painted Post, N.Y.; Frederick E. Noll, Big Flats, N.Y.; Anthony R. Olszewski, Bath, N.Y.; Nikki J. Russo, Corning, N.Y.

[73] Assignee: Corning Incorporated, Corning, N.Y.

[21] Appl. No.: 822,863

[22] Filed: Jan. 21, 1992

[51] Int. Cl.$^5$ .............................. B29D 11/00
[52] U.S. Cl. .............................. 264/1.3; 156/212; 264/1.7; 264/2.7; 264/135; 264/163; 264/265; 264/313; 425/808
[58] Field of Search .............. 351/163, 166, 177; 264/1.1, 1.4, 1.7, 1.3, 2.7, 135, 163, 265, 313, DIG. 64, DIG. 65; 156/273.3, 85, 212; 425/808

[56] References Cited

U.S. PATENT DOCUMENTS

| | | | |
|---|---|---|---|
| 3,322,598 | 5/1967 | Marks et al. | 264/1.7 |
| 4,227,950 | 10/1980 | Spycher | 156/85 |
| 4,268,134 | 5/1981 | Gulati | 351/163 |
| 4,474,355 | 10/1984 | Greshes | 425/808 |
| 4,522,768 | 6/1985 | Roscrow et al. | 425/808 |
| 4,543,146 | 9/1985 | Petcen | 264/1.7 |
| 4,564,408 | 1/1986 | Grumbach et al. | 264/1.7 |
| 4,622,184 | 11/1986 | Barnhart et al. | 264/1.7 |
| 4,793,703 | 12/1988 | Fretz, Jr. | 351/166 |
| 4,798,690 | 1/1989 | Levy | 264/1.7 |
| 4,873,029 | 10/1989 | Blum | 264/1.7 |

Primary Examiner—Jan H. Silbaugh
Assistant Examiner—Mathieu Vargot
Attorney, Agent, or Firm—M. M. Peterson

[57] ABSTRACT

A method of producing a glass-plastic, laminated, ophthalmic lens structure in a continuous operation. A thin, flexible, plastic adhesive layer is applied to a glass element to form a composite body that is inserted in a cylindrical gasket in such manner as to fit snugly and be sealed from the ambient. A monomeric formulation is flowed onto the adhesive layer and cured to form a laminated lens blank.

22 Claims, 5 Drawing Sheets

OPHTHALMIC LENS METHOD

FIELD OF THE INVENTION

The field is production of a glass-plastic, laminated, ophthalmic lens structure.

BACKGROUND OF THE INVENTION

U.S. Pat. No. 4,793,703 (Fretz, Jr.) describes a three-layer, glass-plastic, laminated ophthalmic lens structure. That lens is composed of (1) an inorganic glass element, preferably photochromic glass, (2) a rigid, organic plastic element and (3) an interlayer of flexible, organic adhesive, either thermosetting or thermoplastic. The plastic element is selected to provide a coefficient of thermal expansion in the range of $200°-700 \times 10^{-7}/°$ C. This alleviates severe stress conditions that tend to develop with higher expansion plastics, such as CR-39, marketed by PPG Industries, Pittsburgh, Pa.

An improvement in the three-layer, laminated lens structure of the -703 patent is described in U.S. Pat. No. 5,014,712 (Fetz, Jr.). In accordance with that improvement, the adhesive interlayer is more tightly bonded to the glass and plastic elements by providing reactive groups on the surfaces of the elements and the adhesive interlayer. This controls delayed delamination.

There are various advantages obtained by using an epoxy resin system for the plastic element in the laminated glass-plastic lens. These include low coefficient of thermal expansion, and a high Tg which favors stability during thermal processing. Pending U.S. application Ser. No. 07/589,403, filed Sep. 28, 1990, now U.S. Pat. No. 5,116,684, in the names of E. R. Fretz, Jr. et al. and assigned to the same assignee as this application describes an improved cast, epoxy plastic element and casting method. The improvement avoids striations in the casting. It derives from use of a casting mix in which the ingredients are maintained in certain relationships to each other.

Heretofore, it was thought necessary to produce the three elements of a laminated lens structure separately, and then assemble and process them into a unitary body. Technically, this procedure has been found eminently satisfactory. However, from a practical standpoint, it has proven time consuming and unduly expensive.

This led to a study of possible alternative methods that might prove more cost effective. In particular, the search was aimed at a method of forming a laminated lens blank in a continuous operation with a direct casting step. It is then a basic purpose of the present invention to provide such a simplified, less expensive process.

SUMMARY OF THE INVENTION

Our invention contemplates an improved method of producing a glass-plastic, laminated, ophthalmic lens structure, the components being (a) a thin, inorganic glass element, (b) a rigid, organic plastic element, and (c) a flexible, adhesive interlayer. The improved method comprises the steps of (1) applying a thin, flexible, plastic, adhesive layer to the inner concave surface of the glass element to form a composite body, (2) inserting the composite body in a cylindrical gasket with the peripheral edge of the composite body fitting snugly against the inner wall of the gasket and being sealed off from the ambient, (3) flowing a monomer formulation onto the concave surface of the composite body to a depth at least as great as the thickness of the organic plastic element, and (4) curing the monomer to form a blank for the laminated lens.

In preferred embodiments, the glass element may be precoated with a coupling agent; a thin sheet of thermoplastic urethane may be pressed into intimate contact with the glass element; and the pressure may be applied by a vertically reciprocal plunger, the coated glass being heated.

PRIOR ART

In addition to the patents and pending application mentioned above, attention is also directed to the following U.S. patents and pending application:

U.S. Pat. No. 4,679,918 (Ace) describes a three-layer, glass-plastic, laminated ophthalmic lens wherein the inner surface of the glass layer has a different radius of curvature from the radius of the inner surface of the plastic layer. Thereby, the space between the layers forms a tapered gap that is filled with an elastomeric adhesive. A long chain, polymeric, silicone adhesive is disclosed as a suitable elastomeric material.

U.S. Pat. No. 4,554,299 (Liggett) describes a process for controlling the cure rate for polyurethane cements that may be used as an interior coating or sealant for liquid fuel containers.

Pending U.S. application Ser. No. 07/624,055, filed Dec. 7, 1990, now U.S. Pat. No. 5,139,857, in the names of R. Herndon et al. and assigned to the assignee of the subject application, discloses a method for bonding components having substantially different coefficients of thermal expansion. One article thus produced may be a laminated, glass-plastic, ophthalmic lens. The bonding material is the cured product of an adhesive formulation composed essentially of a hydrogenated epoxide, an acrylate or blocked isocyanate end-capped urethane oligomer and an amine curing agent. It may contain an accelerator, an epoxy diluent and other minor ingredients.

U.S. Pat. No. 5,073,423 (Johnson et al.) describes a laminated heat release or pressure release decal for application to an article, such as an ophthalmic lens. One method of application involves pre-stretching the decal and pressing it onto a lens surface by means of a low durometer, elastomeric pad.

U.S. Pat. No. 4,906,422 (Buckley) describes a method of producing a glass member for a gasketed mould used in producing a multifocal, ophthalmic lens from an organic polymer.

None of this art contemplates direct casting and curing of the organic plastic element in a laminated lens as part of a continuous lens forming operation.

DESCRIPTION OF THE INVENTION

Figures 1, 2:
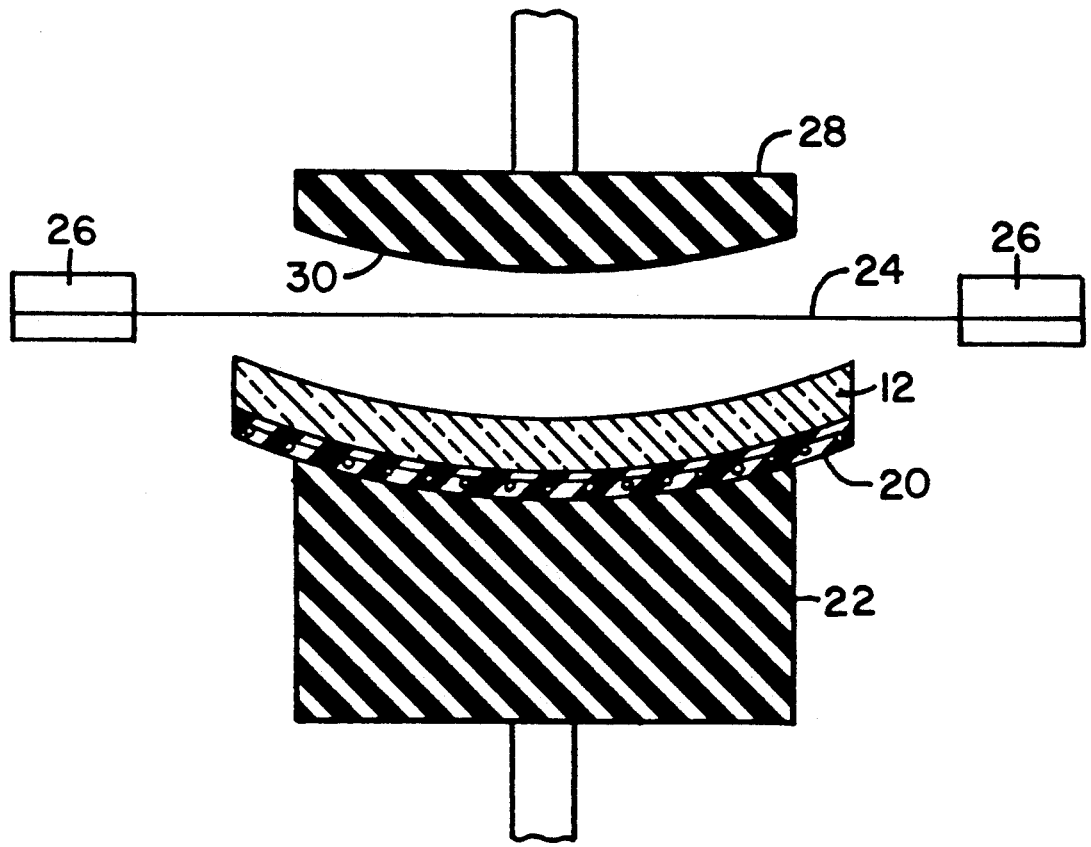
FIG. 1 is a side view in cross-section of a three-layer, laminated, glass-plastic lens structure as known in the prior art.
FIG. 2 is a side view in cross-section of a system for applying an adhesive layer to a glass element to form a composite body.

The present invention provides a relatively inexpensive method of producing a laminated, glass-plastic, ophthalmic lens blank. FIG. 1 is a side view in cross-section showing such a lens blank 10. Lens blank 10 is composed of a glass element 12, a plastic element 14, and an adhesive interlayer 16.

Heretofore, plastic element 14 has preferably been an epoxy body that was cast and cured in a separate operation. A key feature of the present invention is referred to as direct casting, that is, casting and curing element 14 as part of a continuous, lens forming operation. This incorporates the casting and curing step as part of the continuous operation, and eliminates the separate step.

In accordance with the present invention, adhesive layer 16 is provided by applying a thin, flexible, plastic layer over the inner surface of glass element 12 to form a composite body 18. We prefer to employ a thermoplastic urethane which may be preformed by extrusion as a thin sheet. This sheet may be on the order of 0.005 to 0.025" (0.13 to 0.63 mm) thick, preferably 0.015 to 0.020" (0.375 to 0.50 mm). By way of example, we use an aliphatic polyether type urethane available from Thermedics under the designation SG-85A.

In view of our preference for a thermoplastic urethane, the invention is further described with reference to application of such a material for interlayer 16. However, it will be understood that other thermoplastic and thermosetting plastics are contemplated. These include polyvinyl butyral, 1,4 butane diol, polyether polyol and aliphatic diisocyanate.

FIG. 2 is a schematic side view showing a method of applying a thermoplastic urethane film. As there shown, glass element 12 is positioned on a heated pad 20 over the open face of a support member 22. Prior to placing glass element 12 on heated pad 20, glass element 12 is coated with a coupling agent to promote adhesion of the urethane film to the glass. A silane compound is a very suitable coupling agent. The curvature of support member 22, shown as concave, may correspond to the normally convex curvature of the outer surface of glass element 12 which is supported by the member. Member 22 may, for example, be composed of a soft, elastomeric material, preferably a silicone rubber. This avoids glass fracture, or other damage, during a subsequent pressing step.

With glass element 12 positioned on heated pad 20, a thin, thermoplastic urethane sheet 24 is positioned above member 22. The sheet may, for example, be clamped in a metal plate holder 26. A vertically reciprocal plunger 28 may be provided in registry with support member 22. Plunger 28 may be a soft, elastomeric pressing body, preferably a silicone rubber material. It is mounted for reciprocal motion, and is adapted to travel in a vertical line to contact film 24 and prestretch the film before it contacts glass element 12. This avoids possible wrinkles when the film is applied to glass element 12. Support 22 may then be raised toward plunger 28. Sheet 24, positioned intermediate plunger 28 and support 22, is pressed against glass element 12. It will be appreciated that plunger 28 might be lowered in lieu of raising support 22. The essential condition is that the two be brought toward each other to press sheet 24 against glass element 12.

The convex surface 30 of plunger 24 preferably has a radius of curvature slightly smaller than that of glass element 12. Thereby, film 24 is initially pressed into contact with the center of glass element 12. Subsequent contact extends radially toward the periphery of glass element 12. This progressively expels air from between the surfaces, thus avoiding air bubbles being trapped at the interface.

Figure 4:
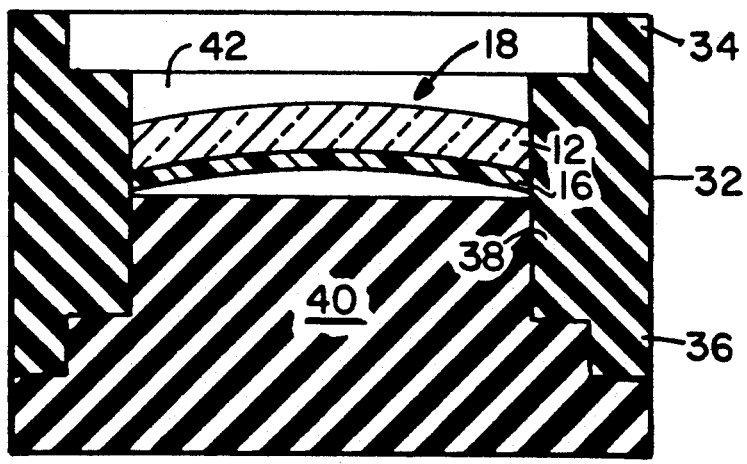
FIGS. 4 and 5 are side views in cross-section showing a system for producing a finished, laminated lens blank.
Figure 7:
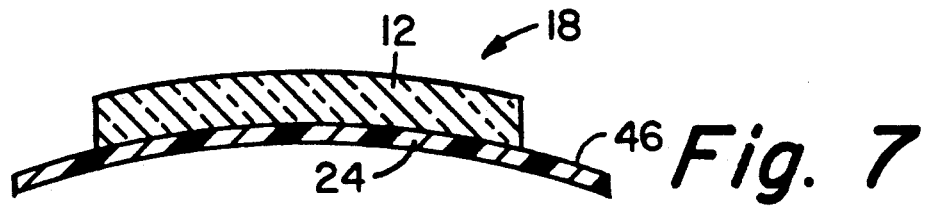
FIG. 7 is a side view in cross-section of a modified form of the composite body produced by the system shown in FIG. 2, FIGS. 8, 9 and 10 are side views in cross-section of a preferred variation of the system illustrated in FIGS. 4 and 5, FIGS. 11 and 12 are side views in cross-section of a further preferred variation of the system illustrated in FIGS. 4 and 5, and FIGS. 13 and 14 are side views in cross-section of a variation of the system illustrated in FIGS. 11 and 12 that is adapted to producing a multifocal lens blank.

Support 22 and plunger 28 are maintained in pressing position for a short period of time, e.g., about three minutes, to effect adhesion of film 24 to glass element 12. This forms a composite body 18 as shown in FIGS. 4 and 7 described, infra. Prior to releasing plunger 28, the temperature of pad 20, and thus glass element 12, which may be about 100° C., will be slightly reduced, for example, by 10° C. Then plunger 28 is raised to its inoperative position. Composite body 18, composed of interlayer 16, formed from film 24, and glass element 12, is then allowed to cool and removed.

The application of film 24 to glass element 12 has been depicted and described in terms of a single unit. This has been purposefully done to more clearly illustrate the method. Actually, it is contemplated that a production operation would employ multiple units operating simultaneously to produce multiple composite bodies 18.

Composite body 18, as formed, has portions of the thermoplastic urethane film 24 extending from its edges. These may be trimmed at the edge of body 18. Alternatively, they may be trimmed to leave an annular overhang for a purpose to be described later.

Composite body 18 is now ready to be inserted in a gasket for further processing. The further processing essentially involves filling the cavity in the gasket above composite body 18 with a monomeric formulation. This formulation is then cured to form plastic element 14.

The gasket may take various forms, some of which are hereafter described, and illustrated in the drawings. The gasket may be formed from a variety of plastic materials ranging from a soft, flexible, silicone rubber to a relatively stiff polyethylene. The primary requirement is that the gasket material permit composite body 18 to be snugly inserted. Accordingly, it is desirable that the material be capable of some degree of flexing. The gasket may optionally have a closed bottom to serve as a base. At least a central portion of the gasket will have an internal diameter that corresponds to the external diameter of composite body 18.

Figure 3:
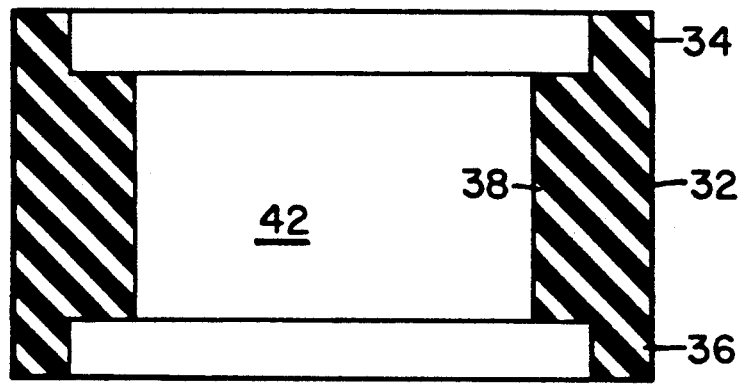
FIG. 3 is a side view in cross-section of a gasket in which the composite body of FIG. 2 may be mounted.

FIG. 3 is a side view in cross-section of a simple form of gasket generally designated 32. Gasket 32 is a cylindrical, annular body that may be molded from an elastomer such as a silicone rubber. It has internally recessed portions 34 and 36 at either end, and a thicker intermediate section 38.

FIG. 4 is a side view in cross-section showing gasket 32 with composite body 18 inserted within intermediate section 38. Gasket 32 is first mounted on a pedestal 40 which extends into the bottom portion of the cavity 42 surrounded by intermediate section 38. Composite body 18 is then pressed into cavity 42 until it comes to rest against pedestal 40 which acts as a fixed stop.

Figure 5:
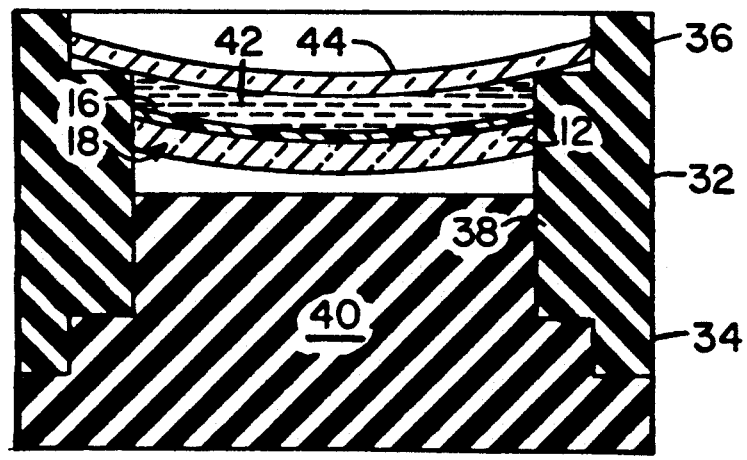

Gasket 32 is now removed from pedestal 40 and its opposite end mounted on pedestal 40 as shown in FIG. 5, a side view in cross-section. That portion of cavity 42 above composite body 18 is now filled with a suitable organic monomeric formulation. Care should be taken to avoid trapped air or streaks. The formulation employed is one adapted, on curing, to produce rigid, organic plastic element 14 in lens blank 10.

As noted earlier, various advantages are obtained by using an epoxy resin system to produce rigid plastic element 14. However, as explained in the Fretz, Jr. -703 patent, various other formulations having suitable thermal expansion coefficients in the range of $200°-700 \times 10^{-7}/°$ C. may be used instead. These include acrylic, polycarbonate, silicone, urethane and polyimide formulations.

The cavity may be filled to the edge of recessed portion 36. However, this increases the amount of material that must be removed in finishing a lens from blank 10. Therefore, we prefer to fill the cavity to a level slightly below the edge of recess 36. Then, a curved cover plate 44, which may be a glass cover having a suitable release agent, is positioned on the rim of gasket 32 with its concave surface contacting the epoxy. This forces the epoxy up to the edge of recess 36 and provides a concave upper surface on the epoxy layer after curing.

The gasket is now placed in an oven operating at the curing temperature of the epoxy formulation. It is maintained at that temperature for a time to fully cure the epoxy formulation. Following the curing step, the oven is cooled, the gasket removed and lens blank 10 is now ready for further processing to produce a laminated, glass-plastic lens of desired prescription.

While the method just described is technically satisfactory, there is a tendency to develop certain defects during the curing step. These defects are near, but not at, the interface between glass element 12 and the urethane film 24 in composite body 18.

Figure 6:
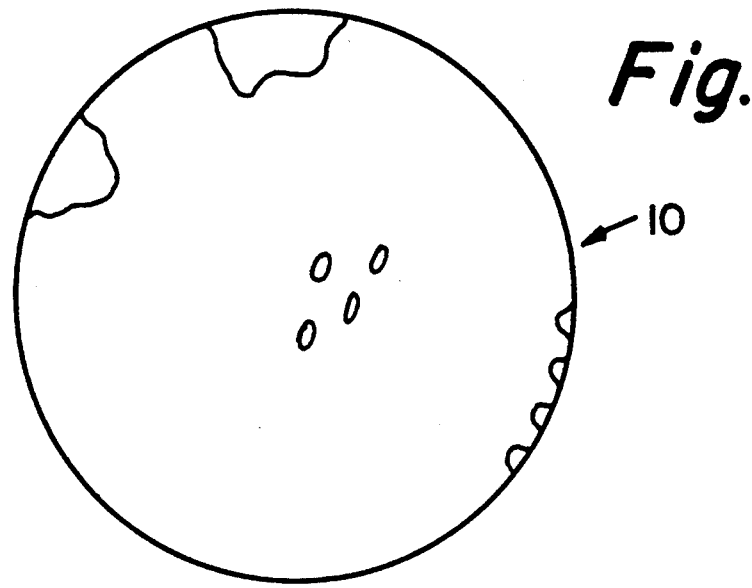
FIG. 6 is a top plan view of a lens blank illustrating defects that the present invention is designed to alleviate.

FIG. 6 is a top plan view of a lens blank illustrating the appearance of the defects encountered. The nature and source of these defects is not known, but they appear to be gaseous inclusions and/or voids. We have found this problem can be alleviated to a large degree by employing modified gasketing techniques as hereafter described.

One technique employs a special form of composite body 18 as illustrated in FIG. 7, a side view in cross-section. The composite body 18 formed, as shown in FIG. 2, has excess thermoplastic urethane film which must be trimmed. As shown in FIG. 7, the excess film is trimmed to leave a radial extension 46 beyond glass element 12 of about 0.5 cm. This provides sufficient overlap to be folded over the edge of glass element 12.

Figure 8:
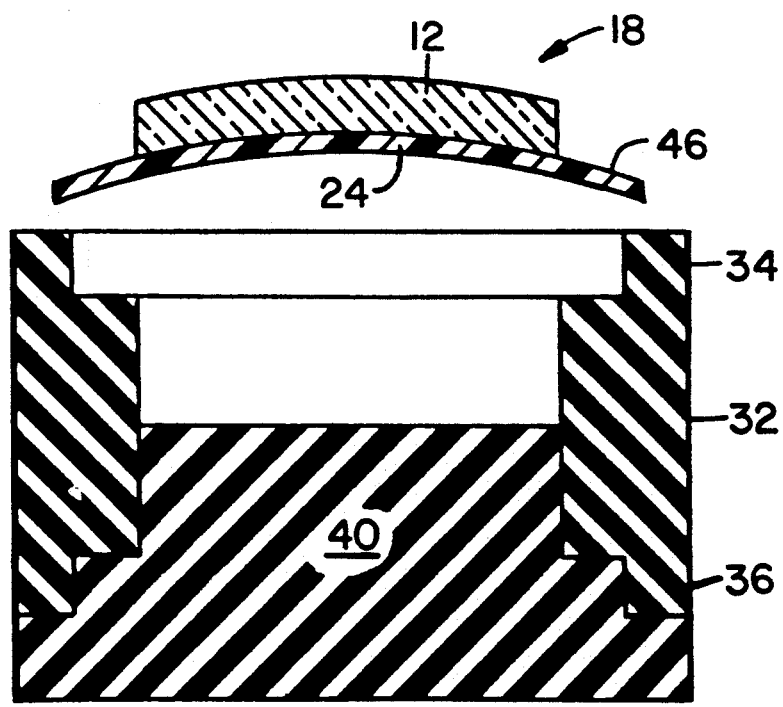

FIG. 8, a side view in cross-section, shows the special composite body 18 of FIG. 7 preparatory to being inserted into rubber gasket 32 which rests on pedestal 40.

Figure 9:
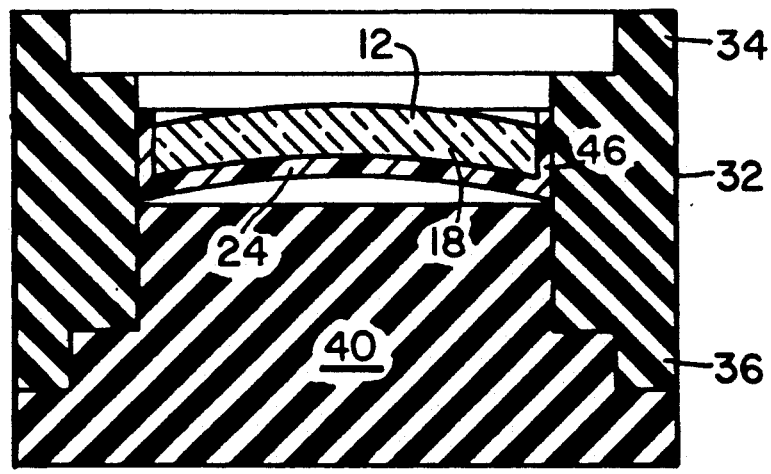

FIG. 9 shows composite body 18 after it has been pressed into gasket 32. As body 18 is pressed into gasket 32, the radial extension 46 of film 24 is forced up around the peripheral edge of glass element 12 and somewhat beyond that edge. Gasket 32 may then have its ends reversed on pedestal 40, as described with reference to FIG. 5.

Figure 10:
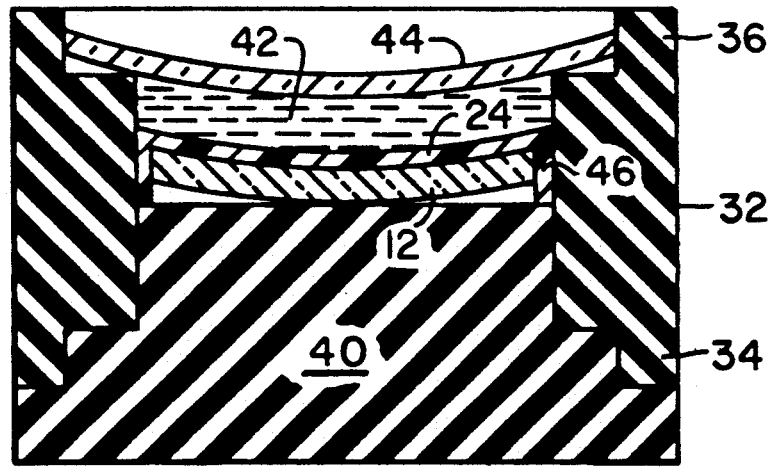

This is illustrated in FIG. 10, a side view in cross-section. The epoxy formulation is then flowed into cavity 42 against the urethane film 24 as before. Glass cover 44 may then be placed on the gasket rim and contacting the epoxy formulation. The assembly is then placed in a curing oven and blank 10 removed from gasket 32 after curing.

The single variation in this procedure is the folding of the radial extension 46 of film 24 over the edge of glass element 12. It is our belief that this serves to seal off the glass-urethane interface from ambient influence. The exact nature of the effect is not certain, but it has been observed to greatly alleviate the defects illustrated in FIG. 6.

Figure 11:
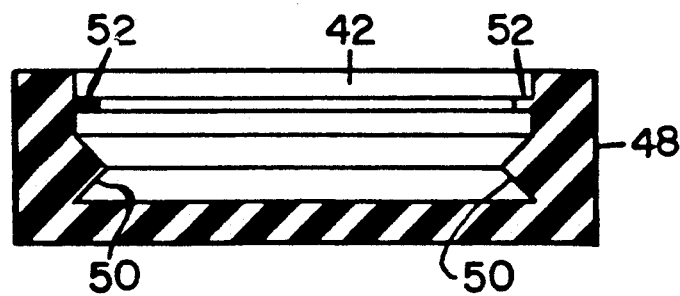

Another modified gasketing procedure has also proven very effective in avoiding the defects of FIG. 6. In this technique, gasket 32 is modified in the manner illustrated in FIG. 11, a side view in cross-section. In this version, modified gasket 48 has an annular, inwardly extending rib or shelf 50, preferably beveled, to accept composite body 18. Spaced slightly above rib 50 is a smaller annular rib 52, also inwardly extending.

The spacing is such as to just accept composite body 18 in a snug fitting relationship. This spacing will depend, in part at least, on the thickness of composite body 18, and, in turn, on that of glass element 12. It is contemplated that glass element 12 may be of microsheet thickness, that is, on the order of 0.25 mm to achieve maximum weight reduction. However, for greater strength and ease in handling, we prefer a glass thickness of about 1.0 to 1.25 mm.

Figure 12:
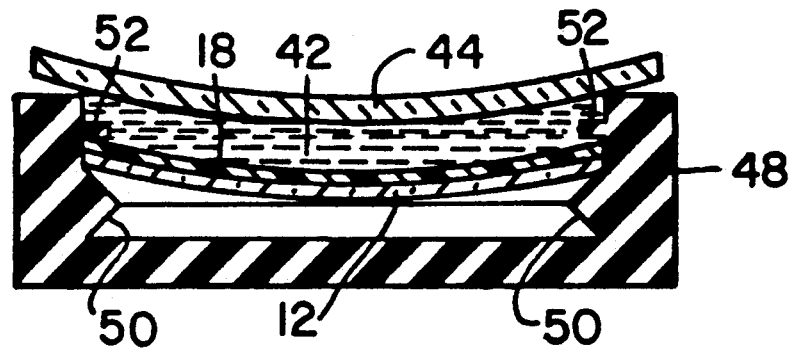

In preparation for further processing, composite body 18 and/or gasket 48 are flexed so that composite body 18 may be snapped into position between ribs 50 and 52, as shown in FIG. 12, a side view in cross-section. It will be appreciated that ribs 50 and 52 may take various forms. The significant requirement is that the edge of body 18 fits snugly between the annular ribs and is effectively sealed off from the ambient atmosphere.

The epoxy monomeric formulation is then flowed into cavity 42 as before. Preferably, the cavity is not completely filled. Rather, curved cover glass 44 is positioned on the rim of gasket 48 to contact the epoxy and provide a concave surface on epoxy element 14 after curing. The assembly is then placed in a curing oven to produce lens blank 10 as before.

Figure 13:
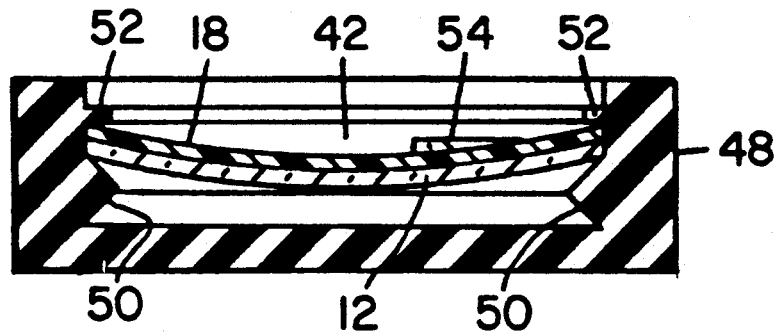
Figure 14:
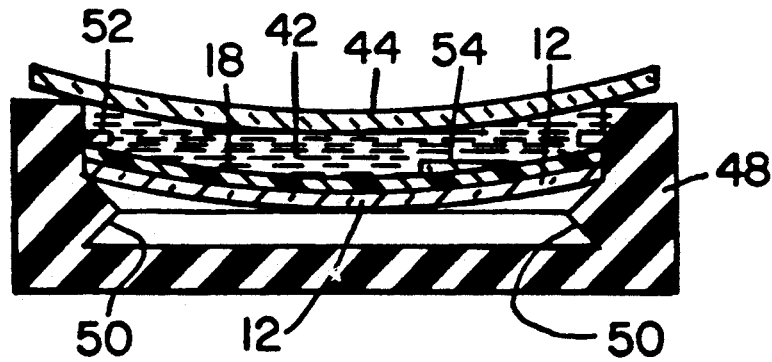

Thus far, the invention has been described with reference to the production of a monofocal lens blank. However, it should be understood that the invention principles are also applicable to the production of multifocal lens blanks as well. FIGS. 13 and 14, side views in cross-section, illustrate the production of a multifocal lens blank in accordance with the present invention.

A composite body 18 may be prepared as illustrated in FIG. 2. Body 18 may then be inserted in a gasket 32, as in FIG. 9, or in a gasket 48, as in FIG. 12. Prior to flowing the monomeric formulation into space 42, a preformed glass or plastic segment 54, having a relatively high refractive index, is positioned on, and adhered to, thermoplastic urethane interlayer 16 of composite body 18. This is illustrated in FIG. 13.

The surface of segment 54 that contacts composite body 18 will be formed with a surface of curvature that corresponds to, but is the reverse of, the surface of curvature of composite body 18. The opposite non-contacting surface of segment 54 will have a curvature such that a predetermined optical power is achieved. This surface of curvature will be determined in known manner by taking into account the contacting surface curvature, the refractive indices of segment 54 and cured element 14, and the desired optical power.

After segment 54 is positioned on composite body 18, an epoxy, or other suitable formulation to form element 14, is flowed into space 42 as shown in FIG. 14. The assembly is then exposed to a curing cycle in an oven, or while passing through a heated tunnel. The particular cycle will be one suited to the particular formulation employed.

Segment 54 may be produced from a formulation known to produce a suitably high refractive index. The preparation of segments, and suitable formulations for the purpose, are disclosed in copending U.S. application Ser. No. 07/682,479 filed Apr. 8, 1991 in the names of David Dasher et al. and assigned to the assignee of the present application. Specifically, the formulation disclosed in Example I of the Dasher et al. copending application was employed to form a segment by injection molding. The cured segment had a refractive index of 1.608 and an Abbé number of 31.

A high index glass segment has also been used. Technically, this is more desirable because it offers the possibility of a higher refractive index with lower dispersion. However, it is also more costly to produce a glass segment.

Molded and cured segment 54 will normally require only minor finishing. Segment 54 adheres adequately to adhesive layer 16 to permit flowing the formulation for element 14 into space 42. During the curing of element 14, segment 54 bonds firmly to the plastic interlayer.

The principles of the invention may also be applied to the production of a blank for a polarizing, laminated, glass-plastic lens. In that case, the procedures described herein will be modified to the extent of selecting a suitable polarizing material for glass element 12. Such polarizing materials are known in the art as described, for example, in U.S. Pat. Nos. 4,479,819 (Borrelli et al.) and 4,486,213 (Lentz et al.) and patents noted therein.

We claim:

1. In a method of producing a glass-plastic, laminated, ophthalmic lens structure wherein a thin, flexible, plastic adhesive layer is applied to an inner concave surface of a glass element to form a composite body with a peripheral edge, a monomer formulation is flowed over the adhesive layer on the composite body to a predetermined depth, and the monomer formulation is cured thereon, the improvement which comprises inserting the composite body in a cylindrical gasket with the peripheral edge of the composite body fitting snugly against an inner wall of the gasket and being sealed off from the ambient prior to flowing the monomer formulation over the adhesive layer.

2. A method in accordance with claim 1 wherein the thin, flexible, plastic, adhesive layer applied to the glass element is a thermoplastic urethane material.

3. A method in accordance with claim 1 wherein the plastic adhesive layer is a sheet 0.005" to 0.025" thick.

4. A method in accordance with claim 1 which comprises applying a coupling agent to the glass element surface before applying the thin, plastic, adhesive layer.

5. A method in accordance with claim 1 wherein the plastic adhesive layer is applied to the glass element by positioning the glass element on a support member with its concave surface exposed and mounting a sheet of the plastic adhesive layer above the exposed surface of the glass element.

6. A method in accordance with claim 5 wherein the glass element is heated to a predetermined temperature before the plastic adhesive layer is applied.

7. A method in accordance with claim 6 wherein the glass element is heated by positioning a heating element between the glass element and the support member.

8. A method in accordance with claim 6 wherein the plastic adhesive layer is applied by applying pressure to prestretch the sheet and press it into intimate contact with the heated glass element.

9. A method in accordance with claim 8 which comprises applying pressure to the sheet by
mounting a vertically reciprocal plunger above and in registry with the support member for the glass element, and
moving the plunger and/or the glass element against the sheet to force it into contact with the glass surface.

10. A method in accordance with claim 9 wherein, after the adhesive layer is adhered to the glass element, the temperature of the glass element is reduced and the plunger is raised.

11. A method in accordance with claim 9 wherein the plunger has a curved convex face that has a slightly lesser radius of curvature than that of the glass element.

12. A method in accordance with claim 1 wherein the cylindrical gasket is formed from a silicone rubber.

13. A method in accordance with claim 1 wherein the cylindrical gasket has annular recesses at each end.

14. A method in accordance with claim 3 wherein the sheet of plastic, adhesive material extends beyond a periphery of the glass element and is trimmed to provide a narrow overhang on the composite body.

15. A method in accordance with claim 14 wherein the composite body is forced into the cylindrical gasket so that the overhang folds over an edge of the glass element to form a seal.

16. A method in accordance with claim 1 wherein the cylindrical gasket has two uniformly spaced, annular ribs on its inner surface.

17. A method in accordance with claim 16 wherein the composite body is inserted in the gasket between the ribs which are so spaced as to seal the peripheral edge of the composite body.

18. A method in accordance with claim 16 wherein one of the two uniformly spaced, annular ribs is beveled and the other is rounded.

19. A method in accordance with claim 1 wherein the monomer formulation flowed onto the composite body is an epoxy formulation.

20. A method in accordance with claim 1 wherein the monomer formulation flowed onto the composite body rises to a level below an upper edge of the gasket and a curved cover is place don the gasket and dips into the formulation to leave a curved upper surface on the glass-plastic lens after curing.

21. A method in accordance with claim 1 wherein, after the composite body is inserted in the gasket and before the monomer formulation is flowed onto the adhesive layer, a preformed segment of relatively high refractive index is positioned on and adhered to the adhesive layer whereby a multifocal blank is produced.

22. A method in accordance with claim 1 wherein the glass element is a polarized glass element.

* * * * *